(12) United States Patent
Valentine et al.

(10) Patent No.: US 10,006,633 B2
(45) Date of Patent: Jun. 26, 2018

(54) INFINITELY VARIABLE INJECTOR FOR IMPROVED SNCR PERFORMANCE

(71) Applicant: PEERLESS MFG. CO., Dallas, TX (US)

(72) Inventors: James M. Valentine, Fairfield, CT (US); Edmund S. Schindler, Fairfield, CT (US); Jeffrey Michael Broderick, Ridgefield, CT (US); R. Gifford Broderick, Wilton, CT (US); John N. Dale, Stratford, CT (US)

(73) Assignee: PEERLESS MFG. CO, Dallas, TX (US)

( * ) Notice: Subject to any disclaimer, the term of this patent is extended or adjusted under 35 U.S.C. 154(b) by 333 days.

(21) Appl. No.: 14/729,991

(22) Filed: Jun. 3, 2015

(65) Prior Publication Data

US 2015/0345785 A1     Dec. 3, 2015

Related U.S. Application Data

(60) Provisional application No. 62/006,968, filed on Jun. 3, 2014.

(51) Int. Cl.
| | |
|---|---|
| *F23J 15/00* | (2006.01) |
| *B01D 53/79* | (2006.01) |
| *B01D 53/60* | (2006.01) |
| *B01D 53/56* | (2006.01) |

(52) U.S. Cl.
CPC ............. *F23J 15/003* (2013.01); *B01D 53/56* (2013.01); *B01D 53/60* (2013.01); *B01D 53/79* (2013.01); *F23J 15/00* (2013.01); *F23J 2215/10* (2013.01); *F23J 2219/20* (2013.01)

(58) Field of Classification Search
CPC ........ F23J 15/003; F23J 15/00; F23J 2215/10; F23J 2215/00; F23J 2219/00; F23J 2219/20; B01D 53/56; B01D 53/60; B01D 53/79
USPC ......... 110/203, 341, 343, 344, 345; 423/235
See application file for complete search history.

(56) References Cited

U.S. PATENT DOCUMENTS

| | | | |
|---|---|---|---|
| 4,777,024 A | 10/1988 | Epperly et al. | |
| 4,780,289 A | 10/1988 | Epperly et al. | |
| 4,830,839 A | 5/1989 | Epperly et al. | |
| 5,252,298 A | 10/1993 | Jones | |
| 5,277,135 A * | 1/1994 | Dubin .................... | B01D 53/56 110/341 |

(Continued)

*Primary Examiner* — Kenneth Rinehart
*Assistant Examiner* — Raymond Williamson
(74) *Attorney, Agent, or Firm* — Katten Muchin Rosenman LLP

(57) ABSTRACT

A system for controlling a reagent flow to a furnace in a SCNR process includes at least one injection distribution module (IDM) for supplying water to a plurality of injection lances, metering valves for supplying a NOx reducing agent to the plurality of injection lances, wherein the reagent injection rate of each injection lance is controlled by one metering valve such that a reagent concentration in each injection lance is adjustable and variable from one another. A method for controlling a reagent flow to a furnace includes providing at least one IDM, and for each IDM, providing a plurality of injection lances in communication with the IDM, supplying water to the plurality of injection lances through the IDM and supplying a NOx reducing agent through metering valves, wherein each metering valve controls the reagent injection rate to one injection lance.

20 Claims, 4 Drawing Sheets

(56) References Cited

U.S. PATENT DOCUMENTS

| | | | |
|---|---|---|---|
| 5,536,482 A * | 7/1996 | Diep | B01D 53/56 423/235 |
| 7,467,749 B2 | 12/2008 | Tarabulski et al. | |
| 2003/0109047 A1 | 6/2003 | Valentine | |
| 2006/0008393 A1 | 1/2006 | Schindler | |
| 2014/0137778 A1 * | 5/2014 | Higgins | B01D 53/79 110/215 |
| 2015/0362255 A1 * | 12/2015 | Von Der Heide | B01D 53/56 423/235 |

\* cited by examiner

INFINITELY VARIABLE INJECTOR FOR IMPROVED SNCR PERFORMANCE

FIELD OF THE INVENTION

The present invention relates generally to the reduction of oxides of nitrogen (NOx) emissions produced by lean burn combustion sources. In particular, the present invention provides a system and method for an improved selective non-catalytic reduction (SNCR) process by controlling the flow of a NOx reducing agent to a furnace during fuel combustion.

BACKGROUND OF THE INVENTION

SNCR has traditionally been applied to industrial and utility boilers, incinerators, and process heaters for the reduction of nitrogen oxide emissions from lean burn combustion sources. In SNCR, a reagent such as aqueous ammonia or aqueous urea is injected into a furnace zone where the temperature is typically 1700-2200 F. The reagent decomposes in the hot furnace gas and goes through a number of chemical reactions that convert nitrogen oxides into water vapor and nitrogen gas without the use of a catalyst.

Hundreds of SNCR systems are in commercial service around the world and the basic SNCR chemistry is well known to those skilled in the art. While it is lower in capital cost than selective catalytic reduction (SCR) of NOx systems, SNCR suffers from lower levels of NOx reduction and poor chemical utilization in part due to temperature variation and unequal NOx spatial distribution across the large dimensions of a furnace. Incomplete chemical reactions lead to secondary pollutants such as ammonia slip ($NH_3$) and carbon monoxide (CO).

It has been traditional to inject a very dilute solution of the reagent in water, with a reagent concentration in the range of 2-10%, and may be as low as 2% to accommodate the high temperatures and the large dimensions across a furnace. Water provides cooling of individual water/reagent droplets as well as mass and momentum to the droplets so that they penetrate across the furnace. In a typical SNCR system, a chemical circulation pump circulates an aqueous solution of 32-50% urea from a bulk storage tank over to a chemical metering and mixing skid where the aqueous based reagent is further diluted with additional water and pumped to separate injector distribution modules (IDM). At each distribution module, the diluted reagent is further split to supply a number of individual injectors. The chemical flow rate to each injector may be monitored and adjusted at the injector distribution module, but the reagent concentration, which comes from the common mixing skid, is fixed and the same to all injectors. The diluted reagent may by atomized by air along the supply line and/or at the injector. The atomizing airflow to each injector may also be monitored and adjusted at the injector distribution module using standard valves.

The dilution rate of an aqueous reagent in the chemical mixing skid may be controlled by using a control valve or a variable speed pump. When the dilution rate changes, the concentration of the reagent solution in the mixing skid changes, yet the concentration of the reagent solution flowing from the mixing skid at any time is the same to all distribution modules and to all injectors. But in reality, the NOx concentration in any one section of the furnace may vary from section to section and from elevation to elevation, especially as load or fuel or the fouling of heat transfer surfaces changes in the furnace. The temperature profile in the furnace also shifts with load. Thus, there is a need for dynamically adjusting the amount of NOx reducing agent fed into different positions of a furnace.

The art has continued to seek methods of improving the NOx reduction performance and chemical (e.g., ammonia, urea) utilization in a SNCR process while preventing the production of other pollutants.

U.S. Pat. No. 4,780,289 to Epperly discloses a process for NOx reduction in an effluent from the combustion of a carbonaceous fuel while minimizing the production of other pollutants. The process comprises determining a NOx reduction versus effluent temperature curve for each of a plurality of treatment regimens, and introducing (most commonly by injecting) a NOx treatment agent into the effluent according to a NOx reducing treatment regimen such that the treatment agent is operating on the high temperature or right side of its NOx reduction versus effluent temperature curve for an efficient NOx reduction. Epperly teaches that adjusting dilution/introduction rate and relative presence of enhancers of the treatment agent will shift the curve and thereby cause the introduction of the treatment agent to operate on the right side of the curve.

U.S. Pat. No. 4,777,024 to Epperly is directed to a multi-stage process for reducing the concentration of pollutants in an effluent. Treatment agents are injected into the effluent of different temperature zones, respectively, to reduce the concentration of nitrogen oxides in the effluent from the combustion of a carbonaceous fuel. The treatment agents include urea/ammonia and an enhancer selected from a group of specific compounds. But the cost, availability, and storage considerations of the enhancer make the already complicated multi-stage process very unattractive.

Furthermore, U.S. Pat. No. 4,830,839 to Epperly describes a process for ammonia scrubbing by use of a non-nitrogenous treatment agent.

U.S. Pat. No. 5,252,298 to Jones takes a different approach for improving NOx reduction efficiency. Jones describes an apparatus for injecting reagents into a combustion effluent through a nozzle, wherein the nozzle may be aimed in response to the temperature of an effluent. In a preferred embodiment, four injector assemblies are used with equal quantities of injection mixture from each nozzle.

U.S. patent application Ser. No. 10/290,797 to Valentine teaches the use of a metering valve to introduce a total volume of dilution water and reagent to a SNCR lance through an injector tip in a SNCR process. Unfortunately, Valentine fails to recognize the high level of dilution water required in a SNCR reagent injection and the physical limitations of readily available metering valves of the automotive fuel injector type (i.e., a solenoid actuated metering valve) proposed for use by Valentine. In SNCR applications, the reagent concentration in water is typically less than 10% and often is only 2-5%. The injection rate of combined dilution water and reagent for each SNCR lance is typically in the range of 1.0-1.5 gpm (gallons per minute), or 60-90 gallons per hour of mixed liquid per SNCR lance. However, a solenoid actuated metering valve has a high-end injection rate of 7-10 gph and perhaps up to 15 gph. Thus, the Valentine method falls short of being practical using commercially available small capacity valves. The Valentine method would require the use of, and/or the development of, a much higher capacity type of metering valve than a solenoid actuated metering valve.

Therefore, there is still a need to provide a system and method for improving SNCR performance. Desirably, the system and method are able to adjust the injection rate of a NOx reducing agent at each SNCR injector to better match the reagent injection to the local NOx concentration across the furnace, while at the same time maintaining relatively constant water and air flow to the injectors to keep the droplet size and penetration into the furnace consistent. It would also be desirable for the injectors placed on the furnace wall to be pivotable with respect to the wall surface so as to target the reagent injection to a preferred temperature zone inside the furnace.

SUMMARY OF THE INVENTION

It is an objective of the invention to provide a system and method for improving SNCR performance.

It is a more specific objective of the invention to provide a system and method for independently adjusting the injection rate of a NOx reducing agent at each SNCR injector in order to better match the reagent injection to the local NOx concentration across a furnace during fuel combustion in a SNCR process.

It is another specific object of the invention to provide a system and method which utilize readily available small capacity metering valves to deliver the reducing reagent in a SNCR process.

It is a further specific objective of the invention to provide a system and method for flexibly adjusting the angular direction of each SNCR injector placed on a furnace wall to target the reagent injection to a preferred temperature zone in the furnace.

These and other objectives are achieved by providing a system for controlling a reagent flow to a furnace which includes at least one injection distribution module, wherein each injection distribution module is in communication with a plurality of injection lances and supplies water from a water supply, through the injection distribution module, to the plurality of injection lances, wherein each of the plurality of injection lances is in communication with a metering valve mounted on a waterline upstream of the injection lance and downstream of the injection distribution module, and wherein the metering valve supplies a reagent solution and controls the reagent injection rate to the injection lance such that a reagent concentration in each of the plurality of injection lances is adjustable and variable from one another.

In some embodiments, the system further comprises a mixing section arranged in a water line downstream of each injection distribution module and upstream of each injection lance for mixing water with the reagent solution supplied by the metering valve to create a diluted reagent solution. The diluted reagent solution is then supplied to the injection lance. In preferred embodiments, the system further comprises a source of atomizing air in communication with the injection lance for supplying pressured air to the injection lance to create an atomized, diluted regent solution. The injection lance which has influxes of two sources of fluid/air (i.e., a diluted reagent solution and air) is called twin-fluid injection lances.

In certain embodiments, the injection lance is a three-fluid injection lances wherein the reagent solution, water, and air all flow to a mixing chamber inside the injection lance to create an atomized, diluted regent solution.

Moreover, the invention provides another system for controlling a reagent flow to a furnace which includes a mixing skid for mixing a reagent solution supplied by a master metering valve and water to create a diluted reagent solution, at least one injection distribution module in communication with the mixing skid for receiving the diluted reagent solution, a plurality of injection lances in communication with the at least one injection distribution module for receiving the diluted reagent solution, wherein each of the plurality of injection lances is in communication of an individual reagent metering valve for controlling an injection rate of the diluted reagent into the injection lance.

In some advantageous embodiments, the adjustment of the reagent injection rate by the metering valve is automatically controlled by a programmable logic controller (PLC).

In some advantageous embodiments, the plurality of injection lances of the system are positioned on a wall of the furnace through holes or openings for injecting the diluted reagent to the combustion zone of the furnace, wherein each injection lance is pivotable with respect to the furnace wall about at least one axis, so that an angle at which the liquid is injected into the furnace is infinitely variable.

Furthermore, the present invention provides a method for controlling a reagent flow to a furnace in a SNCR process comprising the steps of providing at least one injection distribution module, and for each injection distribution module, providing a plurality of injection lances in communication with the injection distribution module, supplying water and a reagent solution to the plurality of injection lances via the injection distribution module and metering valves respectively, wherein each metering valve controls the injection rate of the reagent solution to one injection lance.

In some embodiments, the injection lances are twin-fluid lances, wherein the method further includes mixing water and the reagent solution in a mixing port to create a diluted reagent solution, delivering the diluted reagent solution the injection lance, and supplying pressured air to the injection lance from a source of atomizing air to create an atomized, diluted reagent solution.

In some embodiments, the injection lances are three-fluid lances, wherein the method further includes mixing water, the reagent solution, and pressured air in a mixing chamber inside an injection lance to form an atomized, diluted reagent solution.

The present invention further provides a method for controlling a reagent flow to a furnace in a SNCR process which comprises the steps of: mixing a reagent solution with water in a mixing section to create a diluted reagent solution, supplying the diluted reagent solution to an injection distribution module in communication with the mixing section, distributing the diluted reagent solution to a plurality of injection lances in communication with the injection distribution module, and controlling an injection rate of the diluted reagent solution to each of the plurality of injection lances via an individual metering valve.

In some embodiments, the method further includes the step of injecting the diluted reagent solution to a chamber of the furnace through the injection lances mounted on a furnace wall through holes or openings, wherein each injection lance is pivotable with respect to the furnace wall about at least one axis, so that an angle at which the diluted reagent solution is injected into the furnace is variable. In preferred embodiments, the angle of each injection lance is automatically controlled by a PLC based on information acquired by sensors.

Other objects of the invention and its particular features and advantages will become more apparent from consideration of the following drawings and accompanying detailed description.

DETAILED DESCRIPTION OF THE INVENTION

Figure 1:
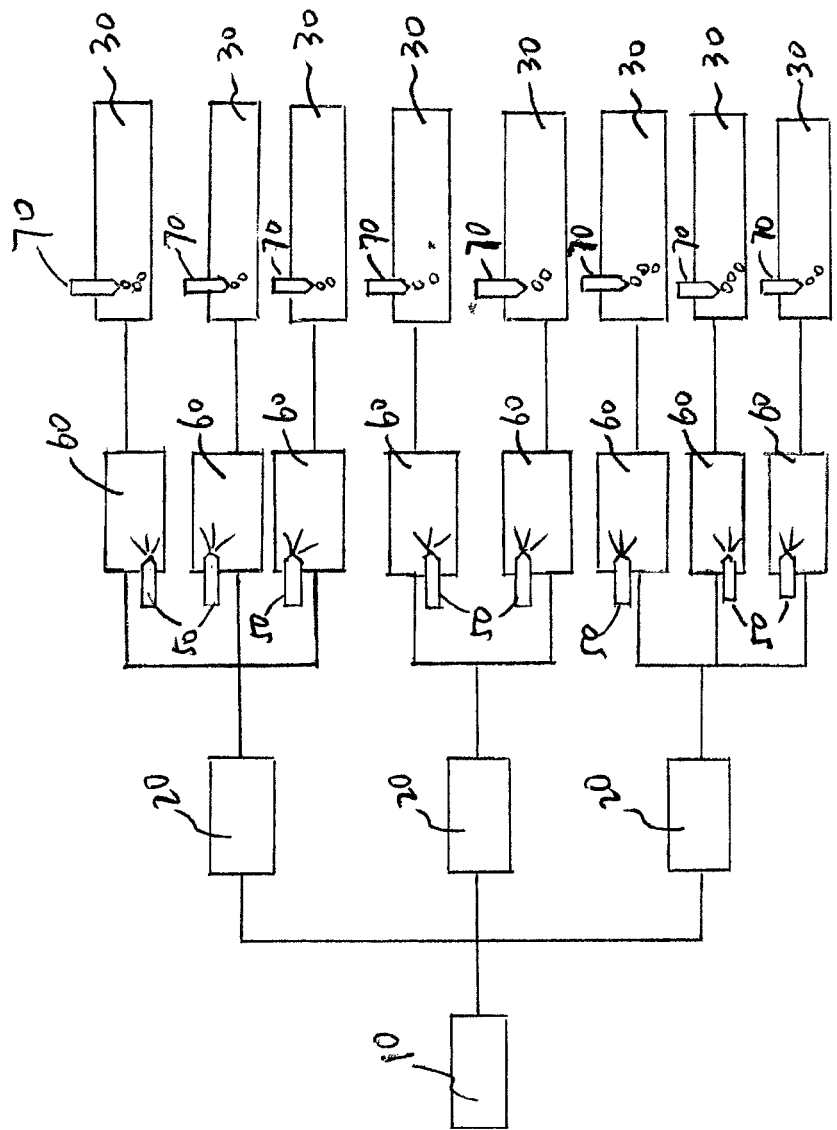
FIG. 1 is a schematic view of part of an injection system for reducing an amount of pollutants produced during combustion of fuel in accordance to one embodiment of the invention, wherein the lances are twin-fluid injection lances.

The present invention utilizes a metering valve in communication with each injection lance for controlling the delivery of a NOx reducing reagent (e.g., aqueous ammonia, aqueous urea solution) to each injection lance. Compared to the prior art method which mixes the reagent and dilution water at a chemical mixing skid and delivers the diluted reagent solution to an injection distribution module, the current invention advantageously requires that only dilution water be delivered to the injection distribution module(s) and the reagent is then added to the dilution water at a point just upstream of each individual SNCR injector. In this way, the reagent injection rate to each SNCR injection lance may be individually controlled by the metering valve and consequently, the reagent concentration in each of the injection lances is adjustable and variable from one another. It should be understood that the terms "injector" and "injection lance" are used interchangeably.

The reagent metering valve may be mounted on a dilution water line in close proximity to each injection lance feeding each injector. The reagent injection rate for each reagent metering valve may be controlled by a PLC or laptop computer by varying the pulse width of the injection valve. Moreover, the reagent feed rate to each SNCR lance injecting into a furnace may be established in advance by a computational fluid dynamics (CFD) modeling. It is known that the CFD modeling is useful to identify zones of high NOx concentration and/or temperature variations across the furnace by predicting these parameters, by field mapping of the NOx concentration in the furnace at different injection rates may be performed using furnace probes, by monitoring the furnace load or temperature, or by monitoring the downstream outlet NOx or ammonia concentration in the exhaust duct as a function of different reagent injection rates from the SNCR injectors.

An injector of the type identified in U.S. Pat. No. 7,467,749 may be used as a metering valve and may be easily adapted to the current invention by inserting a connection in the dilution water line from the injector distribution module over to an individual SNCR injection lance to accept the metering valve. Alternatively, in other embodiments, the SNCR injection lance may be modified to make it a three-fluid lance by fitting a pulse width modulated metering valve to the end of the injection lance. In such cases the SNCR injection lance will generally have an atomization chamber at the distal end where the dilution water, reagent, and air are mixed for atomization before traveling down the length of the lance for injection into the furnace through a tip. In some cases a three-fluid lance may be easily modified to a traditional two-fluid SNCR lance by switching the air and liquid (dilution water) connection points on the lance so that the reagent from the metering valve is mixed with the dilution water in a first chamber of the lance and then the mixed liquid is atomized by the introduction of atomizing air. In other cases, a modified three-fluid injection lance may be desirable.

FIG. 1 illustrates one exemplary embodiment of the present invention which utilizes twin-fluid lances. Water is pumped from a water supply skid (10) to at least one injection distribution module (20) where individual water lines are branched off from each of the IDMs which are eventually connected to individual injection lances (30). On each water line, a metering valve (50) is connected to downstream of the distribution module (20) and upstream of the injection lances (30) for introducing an aqueous urea solution of typically 32%-50% concentration into a port (60) connected to the dilution water line downstream of the distribution module (20) and upstream of the injection lance (30) for mixing the urea solution with water. The resulting diluted urea solution is pumped into the injection lances (30). On each injection lance, a single or multiple atomizing air connections (70) are mounted to allow supply of pressurized air to atomize the dilute solution in the injection lance (30). The atomized diluted urea solution then travels down the injection lance (30) for introduction into combustion gases. In some embodiments, the port (60) may reside in a first chamber of the injection lance (30) and the diluted solution flows from the first chamber to the rest of the injection lance (30) for mixing with pressured air to form an atomized, diluted reagent solution.

In some embodiment, the metering valve (50) may be of the return flow type with urea supply to the valve and return to storage or a recirculation line, or it may be of the non return flow design. The return flow injector, as described in U.S. Pat. No. 7,467,749, the specification of which is incorporated herein in its entirety, is particularly suitable for use as the metering valve (50) in this application.

In some embodiments, all the metering valves (50) may be positioned remotely from and fluidly connected to the injector and/or injection lance. Each of the metering valves may be manually or automatically tuned.

In some embodiments, the metering valves comprise a pulse width modulated solenoid valve. In additional embodiments, the metering valves comprises a variable speed chemical feed pump.

The use of multiple and individually controlled twin-fluid lances system allows for a higher degree of flexibility. By varying the on time of the metering valve (50), the concentration of urea solution introduced into the furnace through each lance (30) may be varied. As such, the total amount of the reagent injected though a particular injection lance over a period of time can also be easily controlled. Other types of twin-fluid lances which are known to one skilled in the art of SNCR can also be used in the prevent invention.

In some embodiments, the concentration of urea solution in each injection lance may be controlled by a programmable logic controller or any other suitable controller as a function of: combustor load, fuel flow rate, exhaust gas flow rate, temperature, NOx concentration before or after the SNCR process, ammonia slip, carbon monoxide concentration, or any combination of those sensor measurements. The concentration of urea solution may be adjusted to provide a necessary quantity of urea to an individual injection lance, or section of lances, to achieve desired emissions. This allows for precise tuning of the reagent injection through the injection lance or section of lances while maintaining the other NOx reduction conditions.

Figure 2:
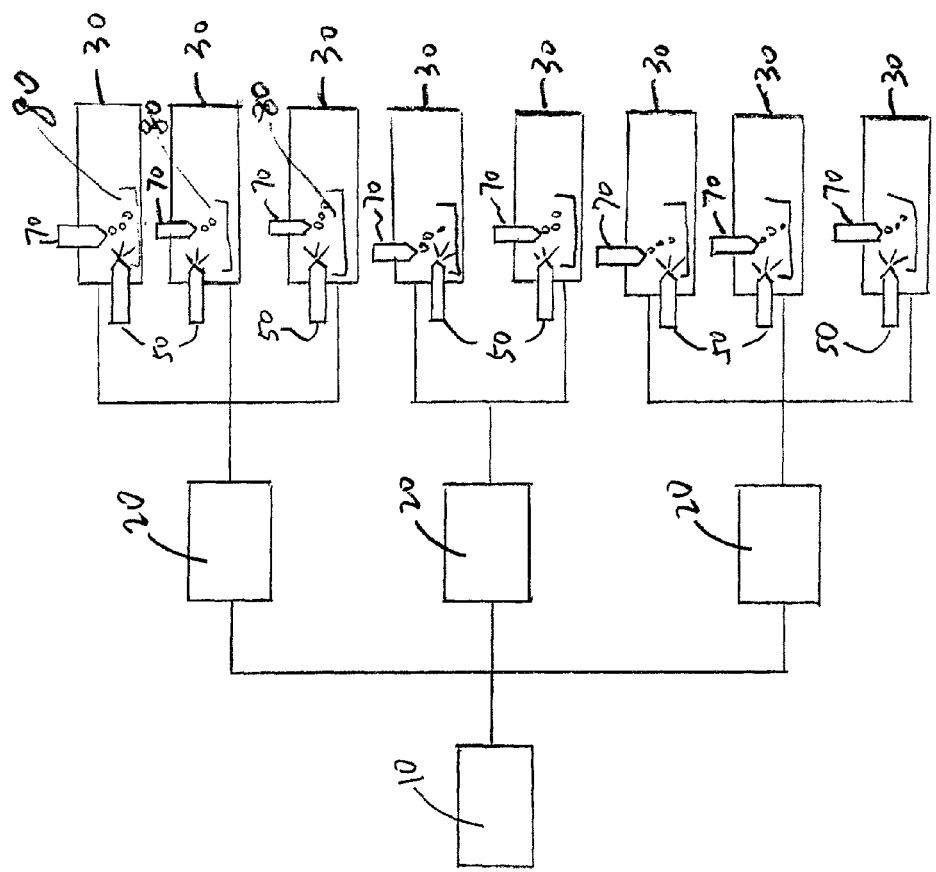
FIG. 2 is a schematic view of part of an injection system for reducing an amount of pollutants produced during combustion of fuel in accordance to another embodiment of the invention, wherein the lances are three-fluid injection lances.

FIG. 2 illustrates another embodiment of the invention which involves three-fluid (water, urea solution, and air) injection lances (30). Water is pumped from a water supply skid (10) to a single or multiple injection distribution modules (20) where individual water lines are branched off from each of the IDMs (20) which are connected to individual injection lances (30). On each injection lance (30), a metering valve (50) fed from a supply of urea solution is connected to introduce an aqueous urea solution (40) of typically 32%-50% concentration into a mixing chamber (80) reside inside the individual injection lance (30). The mixing chamber (80) is also connected with the water line for receiving water from the injection distribution module (20). Compressed air is introduced into the chamber (80) by a single or multiple atomizing air connections (70) for atomization. The atomized diluted urea solution then travels down the injection lance (30) for introduction into the combustion gases via a tip.

The current invention, as illustrated in FIGS. 1 and 2, only requires that the metering valves introduce a much smaller and more concentrated volume of reagent to each individual SNCR injection lance than that of the prior art. As such, small capacity metering valves which are readily available in commerce can be used in the current invention. For example, on a 139 MMBtu incinerator requiring NOx reduction using SNCR, the total quantity of a 32% solution of aqueous urea reagent required is 13 gallons per hour. The SNCR design requires three SNCR injection lances for adequate distribution of mixed reagent across the furnace injection zone. The total dilution water flow rate using standard SNCR design factors is 180 gallons per hour. Therefore, in the prior art approach (see U.S. patent application Ser. No. 10/290,797 to Valentine), each of the three SNCR injection lances would need to be supplied by a metering valve having the ability to flow and meter one-third of the total combined flow of 193 gph, or roughly 64 gph/lance. In contrast, the current invention has each of the three SNCR lances individually supplied with 60 gallons per hour of water from a pressurized dilution water line; and into each individual water line is inserted a metering valve injecting one-third of the total 13 gph of 32% urea reagent required by the process, or 4.3 gph. The flow rate of 4.3 gph of urea reagent is easily accommodated by commercially available solenoid actuated metering valves or injectors as recognized by the current invention.

Figure 3:
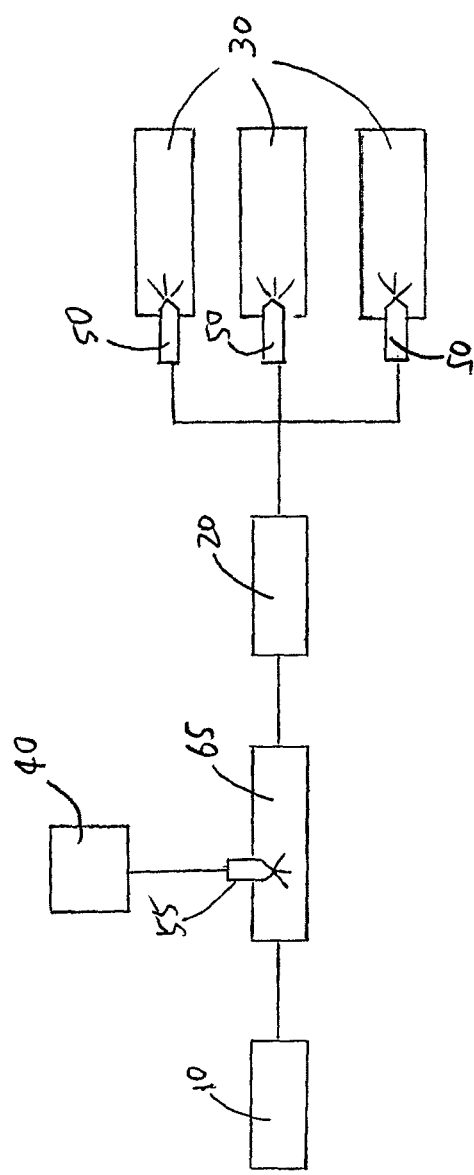
FIG. 3 is a schematic view of part of an injection system for reducing an amount of pollutants produced during combustion of fuel in accordance to a third embodiment of the invention, wherein a stock of pre-diluted reagent solution is prepared and used.

In FIG. 3, a master metering valve (55) is mounted to a dilution water supply line and connected to a urea supply (40). The 32%-50% urea solution is pumped by the master metering valve (55) into a port (65) upstream of an injection distribution module (20) for mixing with water to yield a diluted urea solution. The diluted urea solution flows to the injector distribution module (20) and then split off through separate lines on the distribution module (20) and placed in fluid contact with injection lances (30). Three individual reagent metering valves (50) in communication with the three injection lances (30) respectively may be used to control the diluted reagent solution flowing into the respective injection lances (30).

The embodiment in FIG. 3 is suitable for small furnaces which require only a few injectors or a single level of injection. In this situation, the reagent concentration to the multiple SNCR injectors fed from the IDM will be the same, but the reagent concentration in the master mixing skid may be easily and nearly instantly controlled by changing the pulse width signal to the metering valve at the water inlet to the IDM. Locating the master metering valve on the inlet water line at the distribution panel will reduce the cost of the metering equipment and also reduce the time lag versus traditional systems where the reagent concentration is adjusted at a mixed chemical skid located remotely from the injector location. For reagent flow rates beyond the capacity of the single master metering valve, multiple metering valves may be installed on the water inlet to the IDM. If desired, metering valves may be installed at convenient locations on each dilution water outlet line from the IDM for individually control each of the injection lances. Though the reagent concentration to each injection lance is the same, the reagent amount injected to each injection lance, which is determined by the time and frequency of injections, may be individually and instantly controlled or adjusted from a PLC based controller by varying the pulse width of the injection valve (percent on time).

The metering valves that are suitable for use in the embodiment of FIG. 1 can also be used in the embodiments of FIGS. 2 and 3.

In yet another embodiment, the SNCR injection lances of FIGS. 1-3 may be mounted on retractable and tilting mechanisms as described in U.S. Application Publication No. 2006/0008393, which allows for the injector spray to be pointed upwards or downwards as temperature in the furnace shifts with load, fuel or furnace slugging conditions. This approach helps to better match the injector spray to the targeted temperature zone in the furnace. Using the tilting mechanism with the individual reagent control at each injector allows a near infinite number of injection strategies.

Figure 4:
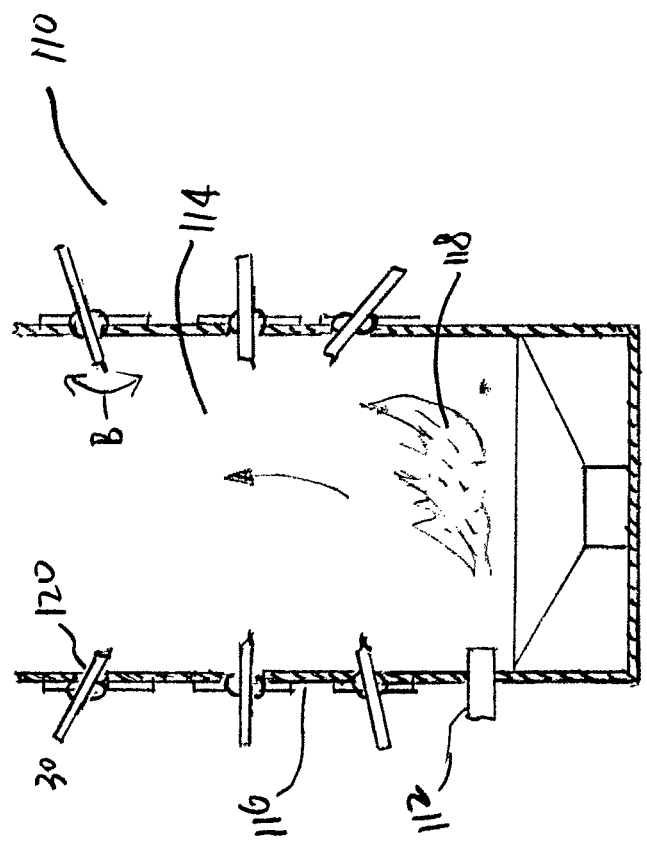
FIG. 4 is a schematic, cross-sectional view of pivotable injection lances placed on a furnace wall in according to one embodiment of the present invention.

FIG. 4 shows a schematic, cross-sectional view of a furnace with pivotable injection lances placed on the furnace wall. In FIG. 4, a furnace (110) contains at least one, but typically many, burner (112), located in a combustion chamber (114) defined by a wall (116). It should be understood that the term "furnace" is used herein for the sake of simplicity, but that the term is intended to encompass boilers, furnaces or any other like device in which is combusted a fuel. In the normal operation of the furnace (110), combustion air and fuel are supplied to the burner (112), and the fuel is burned as shown at a position (118) in the lower portion of combustion chamber (114). Since operation of furnaces of the type disclosed herein are extremely well-known, these aspects of the system are not discussed in detail herein.

The injection lances (30) are placed around the periphery of the furnace perimeter at multiple levels to better match the injection location to the optimum temperature window. Typically each level of injectors has a dedicated injection distribution module. Passing through the wall (116) of the furnace (110) is at least one opening or hole (120) through each of which passes an injection lance (30) through which a NOx reducing agent is injected into the furnace (110). Each injection lance (30) is pivotable with respect to the furnace wall (116) about at least one axis (as indicated by double-ended arrow B) such that the angle at which the pollution reduction substance is injected into the furnace (110) is variable. In some preferred embodiments, the axis about which the injection lance is pivotable is generally horizontal and that the angle of injection lance is in a range of +/−20 degrees from horizontal. The plurality of injection lances (30) may be used to inject the reagent solution of same concentration, but in most circumstances, they are used to inject the reagent of different concentration.

The injection angle and reagent injection rate at each injection lance may be controlled manually from a laptop computer or automatically from a PLC controller. As described before, the PLC controller works in a preprogrammed manner by using an exit NOx, ammonia signal (i.e., ammonia slip), a furnace load signal, a furnace temperature sensor, or other furnace operating characteristics like the timing of soot blowers or other signal representative of the relative slagging condition of the furnace. Accordingly, the system may further comprise one or more sensors for providing the sensed conditions regarding NOx emission, ammonia slip, furnace load and feed rate, and/or furnace gas temperature.

Although the invention has been described in connection with various illustrated embodiments, numerous modifications and adaptations may be made thereto without departing from the spirit and scope of the invention as set forth in the claims.

What is claimed is:

1. A system for controlling a reagent flow to a furnace during fuel combustion in a selective non-catalytic reduction (SNCR) process, said system comprising:
    at least one injection distribution module connected to a water supply,
    wherein each at least one injection distribution module is in communication with a plurality of injection lances and supplies water from the water supply, through said at least one injection distribution module, to said plurality of injection lances,
    wherein said plurality of injection lances is in communication with a corresponding plurality of metering valves,
    wherein each of said plurality of metering valves and a corresponding each of said plurality of injection lances are mounted on a designated and separate waterline, the plurality of metering valves being upstream of said corresponding plurality of injection lances and downstream of said injection distribution module, and
    wherein each of said metering valves supplies a reagent solution and controls a reagent injection rate to the corresponding each of said injection lances such that a reagent concentration in each of said plurality of injection lances is separately adjustable by each of said metering valves and variable from one another.

2. The system of claim 1, wherein said at least one injection distribution module further controls the rate of water supplied to said plurality of injection lances.

3. The system of claim 1, wherein the reagent solution is supplied to said metering valve under pressure from a reagent pumping skid.

4. The system of claim 1 further comprising a mixing port arranged in a water line downstream of said at least one injection distribution module and upstream of said injection lance, wherein:
    said metering valve communicates with said mixing port for supplying and controlling the reagent solution into said mixing port and for mixing with water therein to create a diluted reagent solution, and
    said mixing port is in communication with said injection lance for supplying the diluted reagent solution.

5. The system of claim 4 further comprising a source of atomizing air in communication with said injection lance for supplying pressured air to said injection lance.

6. The system of claim 1, wherein said metering valve is a pulse width modulated solenoid valve.

7. The system of claim 1 further comprising a controller in communication with said metering valve for automatically adjusting pulse width of said metering valve.

8. The system of claim 7, wherein said controller automatically adjusts the reagent injection rate based on one or more of NOx emissions, ammonia emissions, furnace gas temperature, and furnace load or fuel feed rate.

9. The system of claim 1, wherein said injection lance comprises a mixing chamber,
    wherein said mixing chamber contains water which flows from said injection distribution module to said injection lance,
    wherein said metering valve supplies the reagent solution into said mixing chamber,
    wherein a source of atomizing air in communication with said injection lance provides compressed air to said mixing chamber; and
    wherein mixing of the reagent solution, the compressed air and water inside said mixing chamber creates an atomized and diluted reagent solution flowing within said injection lance.

10. The system of claim 1, wherein each of said plurality of injection lances passes through a hole in a wall of the furnace, wherein:
    said injection lance is adapted to inject liquid therein to a chamber of the furnace,
    said injection lance is pivotable with respect to the wall of the furnace about at least one axis, so that an angle at which the liquid is injected by the injection lance into the furnace is variable.

11. The system of claim 10, wherein the axis about which said injection lance is pivotable is generally horizontal and that the angle of injection lance is in a range of +/−20 degrees from horizontal.

12. The system of claim 10 further comprising a controller in communication with said injection lance for automatically adjusting angle of the injection lance based on one or more of NOx emissions, ammonia emissions, furnace gas temperature, and furnace load or fuel feed rate.

13. The system of claim 12, further comprising at least one sensor that comprises a plurality of temperature sensors inside the furnace.

14. A method for controlling a reagent flow to a furnace during fuel combustion in a selective non-catalytic reduction (SNCR) process, said method comprising the steps of:
    providing at least one injection distribution module,
    for each at least one injection distribution module, providing a plurality of injection lances in communication with said at least one injection distribution module,
    supplying water to said plurality of injection lances through said at least one injection distribution module,
    supplying a reagent solution to said plurality of injection lances, and controlling the reagent injection rate to each of said plurality of injection lances via a corresponding plurality of metering valves, each of the corresponding plurality of metering valves being in communication with a corresponding each of said plurality of injection lances, such that a reagent concentration in each of said plurality of injection lances is separately adjustable by each of said metering valves and variable from one another.

15. The method of claim 14 further comprising the steps of:
    providing a mixing port arranged in a water line downstream of said at least one injection distribution module and upstream of said injection lance,
    supplying the reagent solution and controlling the reagent injection rate to said mixing port via said metering valve in communication with said mixing port,
    mixing the reagent solution with water in said mixing port to create a diluted reagent solution, and
    supplying the diluted reagent solution to said injection lance from said mixing port in communication with said injection lance.

16. The method of claim 15 further comprising the step of:
supplying pressured air to said injection lance from a source of atomizing air in communication with said injection lance.

17. The method of claim 14 further comprising the step of:
automatically adjusting the reagent injection rate based on one or more of NOx emissions, ammonia emissions, furnace gas temperature, and furnace load or fuel feed rate.

18. The method of claim 14, wherein said injection lance comprises a mixing chamber, and wherein said method further comprises the steps of:
supplying the reagent solution to said mixing chamber via said metering valve,
supplying pressured air to said mixing chamber from a source of atomizing air in communication with said injection lance,
wherein mixing of the reagent solution, the compressed air and water inside said mixing chamber creates an atomized and diluted reagent solution flowing within said injection lance.

19. The method of claim 14 further comprising the step of injecting liquid contained in said injection lance to a chamber of the furnace,
wherein each of said plurality of injection lances passes through a hole in a wall of the furnace,
wherein said injection lance is pivotable with respect to the wall of the furnace about at least one axis, so that an angle at which the liquid is injected by said injection lance into the furnace is variable.

20. The method of claim 19, wherein the axis about which said injection lance is pivotable is generally horizontal and that the angle of injection lance is in a range of +/−20 degrees from horizontal.

* * * * *